March 14, 1961 F. DANIELS 2,975,116
NEUTRONIC REACTOR
Filed Oct. 8, 1946 2 Sheets-Sheet 2

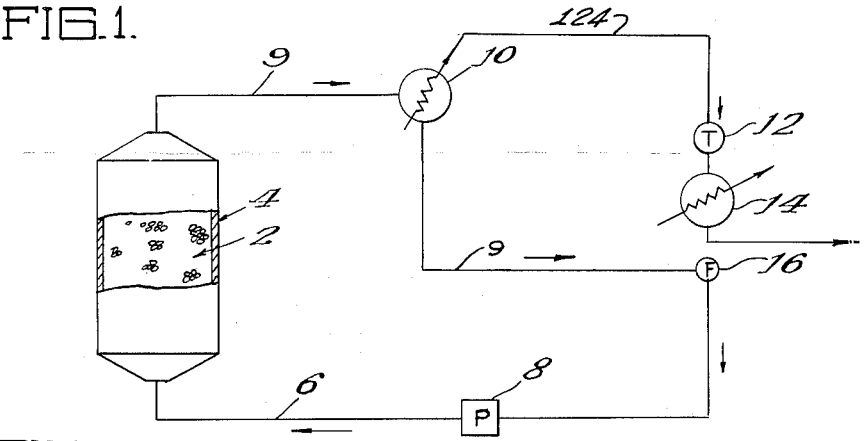
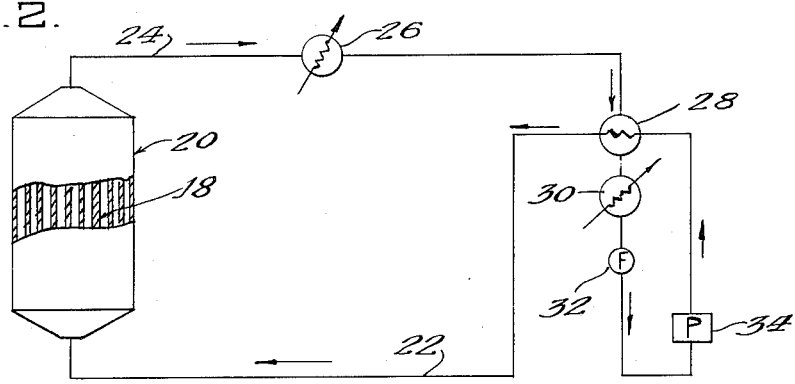
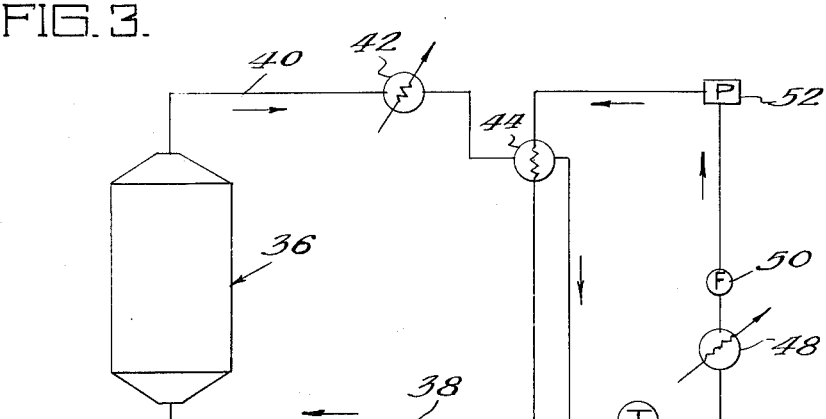

Inventor
Farrington Daniels

United States Patent Office 2,975,116
Patented Mar. 14, 1961

2,975,116
NEUTRONIC REACTOR

Farrington Daniels, Chicago, Ill., assignor to the United States of America as represented by the United States Atomic Energy Commission Filed Oct. 8, 1946, Ser. No. 701,909

2 Claims. (Cl. 204—193.2)

This invention relates to neutronic reactors and more particularly to a novel refractory, neutronically reactive composition capable of sustaining a nuclear fission chain reaction for producing steam for power or other purposes.

In neutronic reactors a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general such reactors comprise bodies of compositions containing fissionable material such, for example, as natural uranium, disposed in a neutron slowing material which slows the neutrons to thermal energies. Such a slowing material is termed a neutron moderator. Carbon and $D_2O$ (heavy water) are typical moderators suitable for such use. Heat is evolved during the reaction which is removed by passage of a coolant through the reactor in heat exchange relationship therewith. Specific details of the theory and essential characteristics of such reactors are set forth in copending application of Enrico Fermi and Leo Szilard, Serial No. 568,904, filed December 19, 1944, now Patent No. 2,708,656.

In neutronic reactors, the ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size, therefore, differs from K by the external leakage factor, and by a factor due to the neutron absorption by localized neutron absorber, and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in four ways:

(1) By absorption or capture in the uranium content of the bodies without producing fission;

(2) By absorption or capture in the moderator material itself;

(3) By absorption or capture by the impurities present in both the uranium bodies and the moderator; and (4) By leakage out of the system through the periphery thereof.

A general object of the invention is to provide a novel refractory composition capable of producing a nuclear fission chain reaction for the production of steam at high temperatures.

Another object of the invention is to design a neutronic reactor wherein the neutrons escaping from the reaction zone of the system are utilized to bombard a neutron absorbent material, such as thorium, whereby said material undergoes nuclear reaction.

Still another object of the invention is to design a neutronic reactor such as above described wherein the entire structure including the reaction zone and the neutron absorbent material is in the form of separable lumps or pellets through which a fluid coolant, such as helium or molten bismuth, is passed to maintain the structure at a predetermined temperature and to produce power.

A more specific object of the invention is to design a neutronic reactor of novel form comprising a substantially homogeneous solid material containing intimately comingled oxides of fissionable and neutron moderator elements as, for example, co-precipitated oxides of uranium and beryllium, preferably compressed to a density of approximately 3 gms./cm.$^3$.

In one embodiment of the invention, the novel neutronically reactive composition is in the form of a pile or group of separable pellets or lumps of said co-precipitated oxides, with voids between the lumps to accommodate passage of an associated coolant through the composition; and in another embodiment of the invention the reactive composition is in the form of a solid block of said oxides with coolant passages formed or drilled through said block.

Still another object of the invention is to design an atomic power plant, such as above described, wherein the nuclear fission chain reaction is sustained within a reaction zone comprising a plurality of separable lumps or pellets containing fissionable material and neutron moderator only. The reflector zone is preferably surrounded by an absorption zone of lumps containing a neutron absorbent material, such as thorium, adapted to undergo nuclear reaction under neutron bombardment by neutrons emanating from the reflector zone, and a second reflector zone may be provided around the absorption zone to reduce neutron losses therefrom.

The foregoing and other objects and advantages of the invention will become apparent from a consideration of the specification and the accompanying drawings wherein:

Fig. 1 is a flow diagram of a power system embodying the invention with the neutronic reactor shown partly in central vertical section;

Fig. 2 is a flow diagram similar to that of Fig. 1 but illustrating a modification of the system;

Fig. 3 is a flow diagram similar to Fig. 1 but illustrating a modification of the system;

Fig. 3 is a flow diagram similar to Fig. 1 but illustrating another modification of the invention with the reactor tank shown in elevation.

Figure 4:
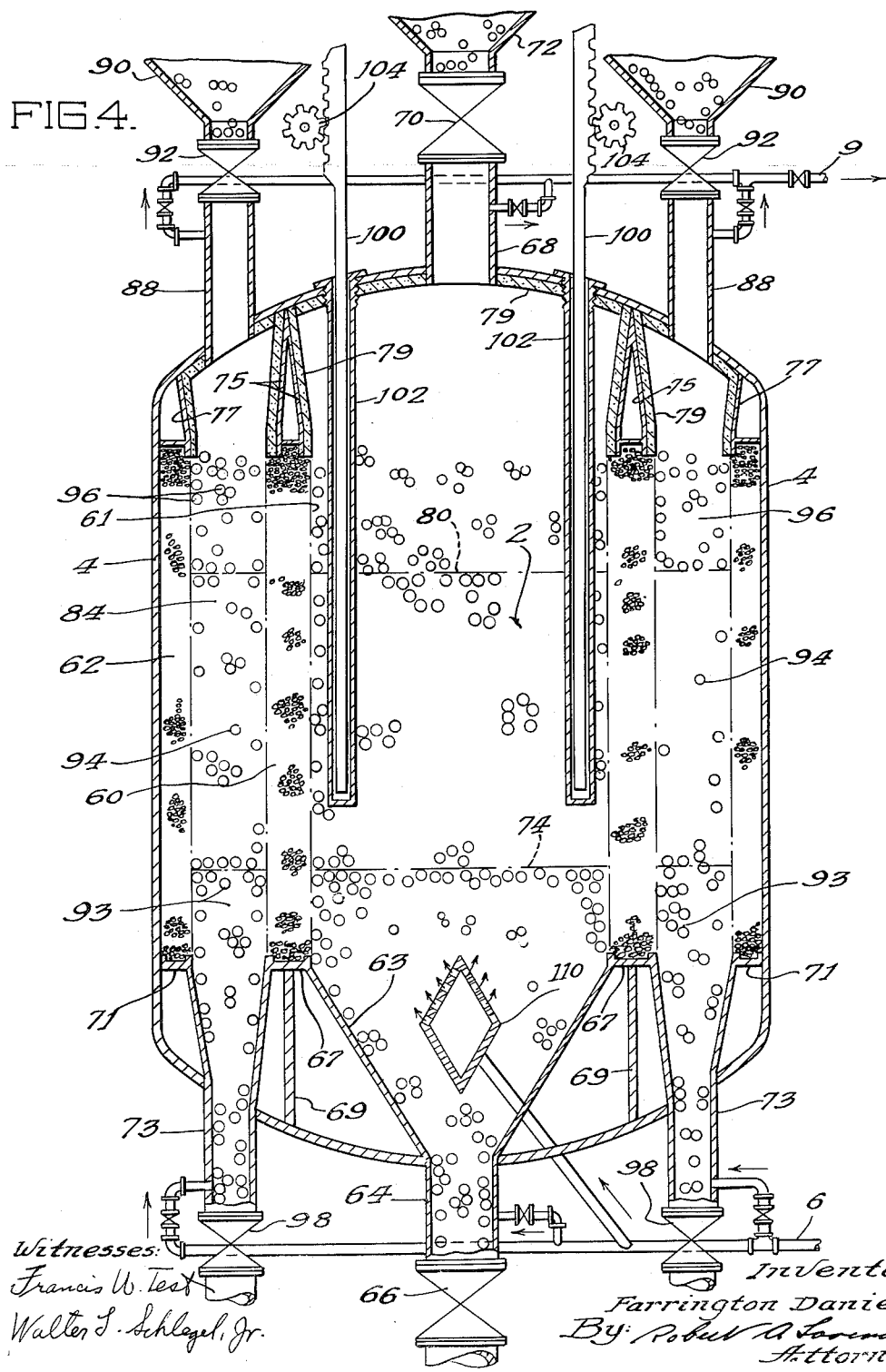
Fig. 4 is an enlarged diagrammatic central vertical sectional view of the reactor shown in Fig. 1, with portions of the structure illustrated in elevation.

Describing the invention in detail and referring first to the embodiment thereof illustrated in Fig. 1, a neutronic reactor generally designated 2, and hereinafter described in detail, is disposed within a chamber or tank 4 into which a fluid, such as helium, is passed through an inlet line 6 including a pump 8. The reactor 2, as hereinafter more fully described, comprises a pile of separable lumps or pellets through which the helium passes and is heated by the heat of the nuclear fission chain reaction within the tank 4. The helium passes from the tank 4 through an outlet line 9 including a conventional boiler 10 wherein the helium passing in the line 9 is passed in heat exchange relationship with a liquid, such as water, to convert the same to steam for power or other purposes. The helium passing from the boiler 10 is conveyed through the line 9 into a filter 16 adapted to absorb fission and corrosion products, said filter being connected to the suction side of the before-mentioned pump 8, the discharge side of which is connected to the inlet line 6. The steam formed in boiler 10 is conveyed through the line 124 into a conventional steam turbine 12 and from the turbine 12 into a heat exchanger 14 where the exhaust steam is condensed.

Referring now to Fig. 2, the neutronic reactor generally designated 18 is contained within a tank or chamber 20 and is preferably in the form of a solid block of refractory, neutronically reactive composition, such as above described, with fluid passages through said composition to accommodate flow of an associated coolant fluid therethrough, as hereinafter described. The tank 20 is connected to an inlet line 22. Fluid passing into the chamber 20 from the line 22 is preferably at a low temperature of, for example, approximately 180° C. and is superheated to a temperature of the order of 1000° C. by the heat of the nuclear fission chain reaction within the reactive composition 18. The superheated fluid passes from the tank 20 through an outlet line 24 into a boiler 26 and thence through a conventional heat exchanger. The cooled fluid passes through the vaporizer 28 into a heat exchanger 30, and is conveyed through a filter 32 adapted to remove fission and corrosion products therefrom. The decontaminated fluid passes from the filter 32 to the suction side of a pump 34, the discharge side of which is connected to the before-mentioned heat exchanger 28, wherein the fluid is heated to a predetermined temperature, for example, of approximately 180° C. The fluid passing from the vaporizer 28 is conducted to the tank 20 through the inlet line 22.

Fig. 3 shows still another embodiment of the invention wherein the neutronic reactor (not shown) is contained within a reaction chamber or tank 36 and is provided, as in the previously described embodiments, with suitable fluid passages. Fluid is conducted to the bottom of the tank 36 through an inlet line 38 at a relatively low temperature of, for example, 180° C. and is superheated to a temperature of about 1000° C. by the nuclear fission chain reaction within the tank. The superheated fluid is conveyed from the tank 36 by an outlet line 40 connected to a boiler 42 from which the cooled fluid passes through a heat exchanger 44, serving a purpose hereinafter described. The cooled fluid passing from the vaporizer 44 is conveyed to a conventional turbine 46 and thence to a heat exchanger 48. Fluid passing from exchanger 48 is conveyed through a filter 50 to eliminate fission and corrosion products, and the decontaminated fluid passes from the filter 50 to the suction side of a pump 52 which forces the fluid through the exchanger 44, wherein the fluid is passed in heat exchange relationship with the relatively high temperature fluid passing from the boiler 42. The low temperature fluid is conducted from the exchanger 44 to the tank 36 through the before-mentioned inlet line 38.

Referring now to Fig. 4 which is an enlarged diagrammatic section view, partly in elevation, of the neutronic reactor shown in Fig. 1, it will be seen that within the tank 4 are spaced radially inner and outer annular reflector walls 60 and 62, respectively, composed of lumps or pellets of beryllium oxide cemented together with any suitable binder. It will be understood by those skilled in the art that beryllium oxide is a good neutron scattering or reflecting material which functions to reduce losses from the system, for the purposes hereinafter described. The inner reflector wall 60 defines a cylindrical space 61 therewithin, said space communicating with a funnel-like bottom wall 63 connected to an outlet pipe 64 equipped with a conventional shut-off valve diagrammatically indicated at 66.

The wall 60 is supported by an annular flange at the top of the wall 63, forming a ledge or shelf 67 supporting wall 60, said shelf being reinforced by an annular vertical web 69. The reflector wall 62 is supported by an annular ledge or shelf 71 projecting from the inner surface of the tank 4. Both of said shelves 67 and 71 are integrally formed with or connected to a plurality of pipes or tubes 73, serving a purpose hereinafter described. The upper extremities of the reflector walls 60 and 62 bear against hollow annular ribs or walls 75 and 77, respectively, said ribs and the top of the inner jacket wall 53 being coated with a suitable layer 79 of refractory material, such as magnesium oxide.

The space 61 within the inner reflector wall 60 is charged through an inlet pipe 68 equipped with a conventional shut-off valve diagrammatically indicated at 70, said valve being connected to a funnel-like tank or reservoir 72. The space 61 is first charged with a pile or group of beryllium oxide lumps to the level indicated at 74 and then with a group or pile of lumps formed of co-precipitated oxides of beryllium and a fissionable isotope to provide the before-mentioned reactive mass 2 which sustains the nuclear fission chain reaction. The reactive mass 2 of lumps extends to the level indicated at 80 and is then covered with another group of beryllium oxide lumps or pellets.

An annular space 84 between the reflector walls 60 and 62 is charged, as hereinafter described, through a plurality of inlet pipes 88 communicating with funnel-like tanks or receptacles 90 through conventional shut-off valves diagrammatically indicated at 92. The space 84 is first charged to the level 74 with a group or pile 93 of beryllium oxide lumps, and then with a group 94 of thorium oxide lumps to the level 80 and finally with a group 96 of beryllium oxide lumps. The bottom of the space 84 communicates with the before-mentioned pipes or funnels 73 which are equipped with conventional shut-off valves 98.

Thus, it will be seen that the above-described system comprises a reaction zone 2 within which the nuclear fission chain reaction is sustained, said zone being completely surrounded by reflector zones of neutron moderator material adapted to reflect neutrons emanating from the reaction zone back into said reaction zone to increase the neutron reproduction ratio thereof, as more fully described in the above-mentioned copending application. Externally of the vertical reflector zone is an annular absorption zone containing the group 94 entirely surrounded by another reflector wall 62 and groups 93 and 96 of reflecting material, said absorption zone containing pellets of thorium oxide adapted to be bombarded by neutrons escaping from the reaction zone 2 to produce $U^{233}$ according to the following isotope sequence:

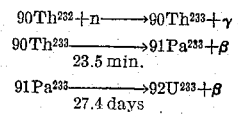

It will be understood that from time to time the neutron bombarded thorium oxide pellets 94 and the beryllium oxide pellets 93 and 96 within the space 84 may be discharged by opening the valves 98 and the discharged material may be treated externally of the system to recover $U^{233}$ and other products of nuclear reaction due to neutron bombardment. Furthermore, when the fissionable material within the reactor 2 is used up as the result of the nuclear fission chain reaction therein, so that the neutron reproduction ratio of the system falls below unity, the space 61 may be discharged by opening the valve 66, thereby permitting the pellets within the space 61 to pass through the pipe 64 to a point disposed externally of the system. The space 61 may then be recharged.

The neutron density within the system is controlled by control rods 100 of neutron absorbent material, such as cadmium, said rods being reciprocal within iron tubes 102 connected to the tank 4. The rod 100 is actuated in response to neutron monitoring means, such as by an ionization chamber (not shown), by any suitable means, such as rack and pinion mechanisms indicated at 104.

The system is cooled by a fluid such as helium passing through the before-mentioned inlet line 6, said line being connected to the pipes 73 and to a perforated inlet tank 110. The helium flows upwardly through the lumps in the system and passes through the pipes 68 and 88 into the before-mentioned outlet line 9.

The lumps or pellets within the reactor 2 are preferably formed of co-precipitated oxides of beryllium and at least one fissionable isotope, such as $U^{233}$ or $U^{235}$. This composition is produced by precipitating the mixed oxides from a solution containing both beryllium and uranium salts, and the resulting precipitate contains the fissionable isotope or isotopes intimately comingled with and evenly dispersed throughout the beryllium oxide which functions as a neutron moderator to slow neutrons within the reactor 2 to thermal energies at which they are most effective to fission the fissionable material. The pellets within the reactor 2 are preferably compressed to a density of about 3 gms./cm.$^3$ and are in the form of rough spheres about 1 to 3 inches in diameter.

The following table indicates K values and operative sizes of reactors constructed of uranium and beryllium oxides co-precipitated in the manner described:

| Percent by weight | | Neutron loss to BeO, percent | K | Weight of $UO_2$, kg. | Weight $UO_2$ with 30% voids kg. |
|---|---|---|---|---|---|
| BeO | $UO_2$ | | | | |
| 98 | 2 | 1.6 | 2.09 | 36 | 72 |
| 99 | 1 | 3.2 | 2.03 | 22 | 44 |
| 99.5 | 0.5 | 6.2 | 1.97 | 14.5 | 29 |
| 99.75 | 0.25 | 11.7 | 1.86 | 11 | 22 |

The figures indicated in the table are based on the assumption that the uranium is pure $U^{235}$; however, the figures are valid if the concentration of uranium oxide is such that the amount of $U^{235}$ is equal to that indicated, provided that the amount of $U^{238}$ does not exceed substantially the amount of $U^{235}$ present. The table indicates the necessary amount of uranium oxides to sustain a chain reaction in systems where no voids are present and in systems where 30% voids are present. In actual practice such voids are necessary to accommodate passage of a coolant fluid through the reactor in the manner above described. It will be understood that if the voids exceed 30%, a chain reaction may be sustained by proportionately increasing the amount of uranium oxide in the reactive composition. If desired plutonium oxide may be substituted for uranium oxide.

Although the above described theory of nuclear reaction is based on the best experimental evidence known at present, it will be understood that experimental data later discovered may modify the above discussed theory.

It will be understood that although the present invention has been described with respect to the specific details of certain embodiments thereof, it is not intended that such details shall be regarded as limitations upon the scope of the invention except insofar as included in the accompanying claims.

What is claimed is:

1. A neutronic reactor comprising a central mass of reactive composition comprising discrete bodies of a refractory mixture of uranium oxide and beryllium oxide enriched in thermal neutron fissionable isotope, a layer of discrete bodies of beryllium oxide completely surrounding said central mass, a second layer of discrete bodies of thorium oxide disposed externally of the first-mentioned layer, said layers and said mass defining a composite mass having irregular and intercommunicating voids between said bodies, and a coolant in said voids.

2. A neutronic reactor active portion comprising a body of pellets of intimately mixed BeO and $UO_2$ particles having 30% voids between the pellets, each pellet consisting of 0.25% $UO_2$ and 99.75% BeO, the total weight of $UO_2$ being at least 22 kg. and the uranius in the $UO_2$ consisting essentially of the isotope $U^{235}$.

References Cited in the file of this patent
UNITED STATES PATENTS

| 2,708,656 | Fermi et al. | May 17, 1955 |
| 2,743,225 | Ohlinger et al. | Apr. 24, 1956 |

FOREIGN PATENTS

| 114,150 | Australia | May 2, 1940 |
| 233,011 | Switzerland | Oct. 2, 1944 |
| 861,390 | France | Oct. 28, 1940 |

OTHER REFERENCES

Kelly et al.: Physical Review 73, 1135–9 (1948). Copy in Patent Office Library.

Handbook of Chemistry and Physics, 26th Edition, pages 348, 349, Chemical Rubber Pub. Co., Cleveland, Ohio (1942). Copy in Patent Office Library.

A Comprehensive Treatise on Inorganic and Theoretical Chemistry, by J. W. Mellor, vol. 12, Longmans, Green & Co., London, 1st published 1932, reprinted 1942 and 1947. Page 63. Copy in Library.

A Forum Report. Nuclear Reactor Development—July 1954. Atomic Industrial Forum. 260 Madison Ave., New York 16, New York. O. Townsend et al. Page 18.

Introduction to Nuclear Engineering. R. Stephenson. McGraw-Hill Book Co., New York, 1954. Page 100.

Harwell. The British Atomic Energy Research Establishment. 1946–1951. Her Majesty's Stationary Office. London, 1952. Pages 37–42.

J. Applied Physics, vol. 10 (1939), pages 612–614. (An article by Roberts et al.) In Patent Office Library.